(12) United States Patent
Wilde et al.

(10) Patent No.: US 11,010,539 B2
(45) Date of Patent: May 18, 2021

(54) STATE-SPECIFIC COMMANDS IN COLLABORATION SERVICES

(71) Applicant: Microsoft Technology Licensing, LLC, Redmond, WA (US)

(72) Inventors: Benjamin G. Wilde, Quincy, MA (US); Jade Kessler, Cambridge, MA (US); Ashlyn D. Zoecklein, Middleton, MA (US); Douglas L. Milvaney, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 14/755,950

(22) Filed: Jun. 30, 2015

(65) Prior Publication Data

US 2017/0004119 A1 Jan. 5, 2017

(51) Int. Cl.
*G06F 40/166* (2020.01)
*G06Q 10/10* (2012.01)
*G06F 3/0484* (2013.01)
*G06F 11/20* (2006.01)
*G06F 40/169* (2020.01)

(52) U.S. Cl.
CPC .......... *G06F 40/166* (2020.01); *G06F 3/0484* (2013.01); *G06F 11/2076* (2013.01); *G06F 40/169* (2020.01); *G06Q 10/101* (2013.01); *G06Q 10/103* (2013.01)

(58) Field of Classification Search
CPC ............... G06F 17/24; G06F 17/30082; G06F 17/30575; G06F 17/30873; G06F 3/0484; G06F 11/2076; G06F 2221/0793; G06F 2216/15; G06F 9/52; G06F 40/166; G06F 3/0482; G06F 40/169; H04L 7/00; H04L 67/1095; G06Q 10/101; G06Q 10/103
See application file for complete search history.

(56) References Cited

U.S. PATENT DOCUMENTS

| | | | |
|---|---|---|---|
| 5,608,872 A * | 3/1997 | Schwartz | H04L 12/1813 345/502 |
| 7,640,506 B2 | 12/2009 | Pratley et al. | |
| 8,060,820 B2 | 11/2011 | Bedi et al. | |
| 8,417,666 B2 * | 4/2013 | Bailor | G06F 21/6227 707/608 |
| 8,484,292 B2 | 7/2013 | Spataro et al. | |
| 9,449,103 B2 * | 9/2016 | Boland | G06F 17/30867 |

(Continued)

OTHER PUBLICATIONS

Masoodian, et al., "Recoled: a Group-Aware Collaborative Text Editor for Capturing Document History", In Proceedings of IADIS International Conference on WWW/Internet, vol. 1, Oct. 19, 2005, 8 pages.

(Continued)

*Primary Examiner* — Chau T Nguyen

(57) ABSTRACT

Implementations of enhanced content collaboration technology are disclosed herein. In an implementation, a collaboration service determines which collaboration commands to surface in association with each user in a list of users collaborating on a document. The collaboration commands are selected based on each user's collaboration state. The service updates local applications with information indicative of the user state, so that the local applications may surface a user-specific, collaboration state-driven selection of commands.

20 Claims, 8 Drawing Sheets

(56) References Cited

U.S. PATENT DOCUMENTS

| | | | | |
|---|---|---|---|---|
| 9,614,880 | B1* | 4/2017 | Davis | H04L 65/403 |
| 9,787,616 | B2* | 10/2017 | Xu | H04L 51/04 |
| 9,794,760 | B2* | 10/2017 | Quatrano | H04L 67/02 |
| 2002/0076025 | A1* | 6/2002 | Liversidge | G06Q 10/10 |
| | | | | 379/202.01 |
| 2004/0267871 | A1* | 12/2004 | Pratley | G06Q 10/10 |
| | | | | 709/200 |
| 2006/0026502 | A1 | 2/2006 | Dutta | |
| 2007/0266077 | A1* | 11/2007 | Wengrovitz | H04W 4/10 |
| | | | | 709/203 |
| 2008/0005235 | A1* | 1/2008 | Hegde | G06Q 10/10 |
| | | | | 709/204 |
| 2008/0028323 | A1 | 1/2008 | Rosen et al. | |
| 2008/0126990 | A1* | 5/2008 | Kumar | G06Q 10/10 |
| | | | | 715/835 |
| 2008/0208867 | A1* | 8/2008 | Poston | G06F 16/958 |
| 2008/0256181 | A1* | 10/2008 | Morita | G16H 10/60 |
| | | | | 709/204 |
| 2009/0110169 | A1* | 4/2009 | Whitsell | H04L 12/1818 |
| | | | | 379/205.01 |
| 2010/0061276 | A1* | 3/2010 | Havens | H04L 12/1813 |
| | | | | 370/260 |
| 2013/0019182 | A1 | 1/2013 | Gil et al. | |
| 2013/0151940 | A1 | 6/2013 | Bailor et al. | |
| 2013/0185368 | A1* | 7/2013 | Nordstrom | H04W 4/21 |
| | | | | 709/206 |
| 2013/0246901 | A1* | 9/2013 | Massand | G06F 17/24 |
| | | | | 715/229 |
| 2013/0297705 | A1* | 11/2013 | Arora | G06Q 50/01 |
| | | | | 709/205 |
| 2013/0326330 | A1* | 12/2013 | Harris | G06F 40/166 |
| | | | | 715/234 |
| 2014/0208220 | A1* | 7/2014 | Watal | H04L 67/10 |
| | | | | 715/738 |
| 2014/0379641 | A1 | 12/2014 | Kinsman et al. | |
| 2015/0082195 | A1 | 3/2015 | Berger et al. | |
| 2015/0207831 | A1* | 7/2015 | Gaspari | G06Q 10/101 |
| | | | | 709/205 |
| 2016/0100019 | A1* | 4/2016 | Leondires | G06F 21/6218 |
| | | | | 709/204 |
| 2016/0179335 | A1* | 6/2016 | Thompson | G06F 3/041 |
| | | | | 345/173 |

OTHER PUBLICATIONS

Miles, et al., "Reviewing Designs for a Synchronous-Asynchronous Group Editing Environment", In PProceedings of Computer Supported Cooperative Work, Jan. 1993, 30 pages.

Prakash, Atul, "Group Editors", In Proceedings of the International ACM SIGGROUP Conference on Supporting Group Work, Nov. 1999, 32 pages.

"The Synchronous Collaboration Framework (SCF)", Retrieved on: Mar. 31, 2015, Available at: http://www.sdn.sap.com/irj/scn/go/portal/prtroot/docs/library/uuid/e0b69b6f-1e2e-2a10-3683-84e6139c6bc0?QuickLink=index&overridelayout=true&16209206767760.

* cited by examiner

STATE-SPECIFIC COMMANDS IN COLLABORATION SERVICES

TECHNICAL BACKGROUND

Collaboration services allow users to collaborate with respect to content that is shared between them. A group of users may share a document, for example. With the support of a collaboration service, the users may edit the document together, review and comment on each other's work, and otherwise co-author the document in real-time from multiple locations.

Some collaboration services include instant messaging features, video chat capabilities, and other communication services embedded in an application's user interface. Such tools enhance the collaboration experience by making it easy for users to communicate while working on content.

A recent improvement to user interface technology for document collaboration includes a list of users who have access to a given document, combined with an indication of which of those users are presently editing the document. This gives a user a quick view into not only who the document is shared with, but also who is presently collaborating on it.

Overview

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

Technology is disclosed herein that enhances the user experience with online collaboration. In an implementation, a list of users associated collaboratively with a shared document are ordered in a user interface based at least partly on their respective collaboration states with respect to the document. As their collaboration states change, updates are received from a collaboration service and the list of users is re-ordered to reflect their updated collaboration states.

In another implementation, the collaboration service determines which collaboration commands to surface in association with each user, based on that user's collaboration state. The service updates local applications with information indicative of the same, so that the local applications may surface the user-specific, collaboration state-driven selection of commands.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
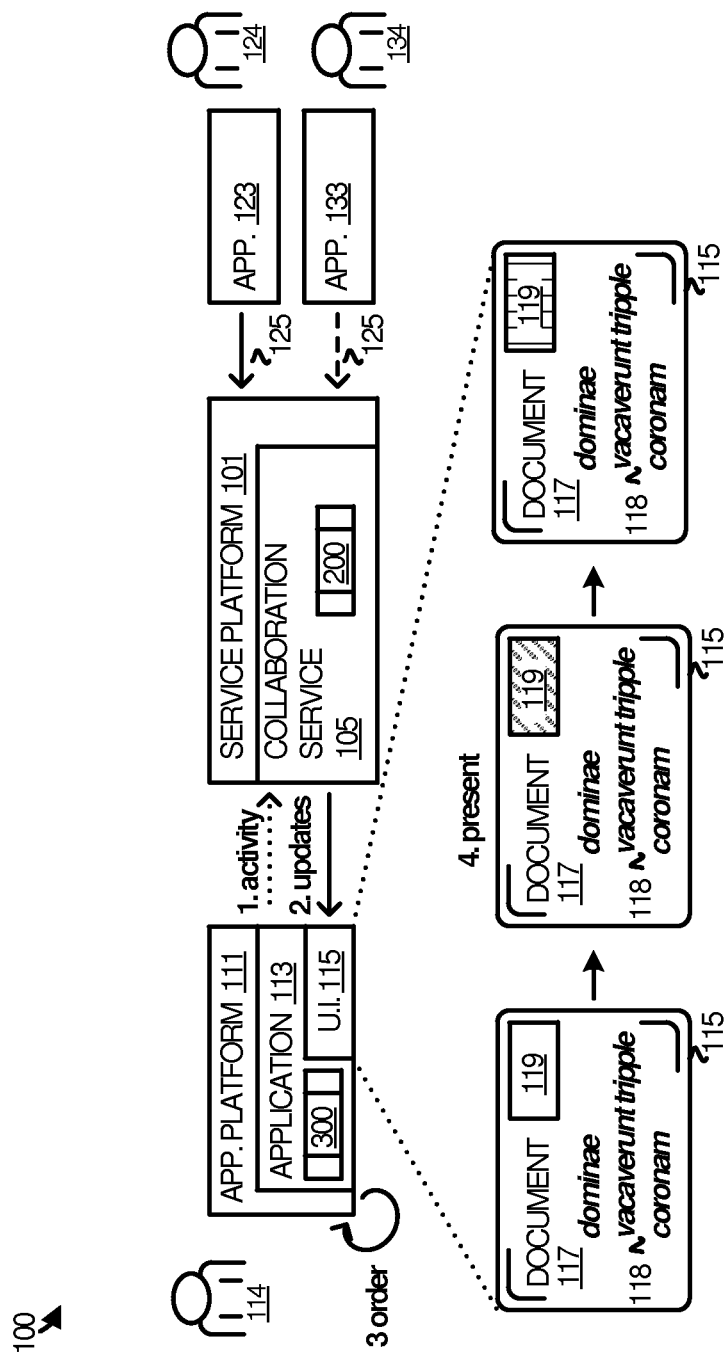
FIG. 1 illustrates a collaboration architecture and an operational scenario in an implementation of enhanced collaboration services.

Technology disclosed herein enhances the content collaboration experience by leveraging the collaborative state of individual users in a group to tailor the presentation of shared content. In various implementations, a view of a list of users that share a document (or other types of content) may be presented in a user interface. The list may be merged from a list of all users associated with the document and a second list that references only those users presently working on the document.

However, the relative level to which each individual user may be engaged with the document can vary from moment to moment. For instance, one user may be actively editing a document while another user may be passively reviewing the document. Still other users may be idle with respect to the document. Rather than present the list of users in a pre-determined order, the users may be ordered based on their relative levels of collaboration, or their collaboration state. Thus, users currently editing a document may be presented ahead of other users who are merely reviewing the document or who are idle.

In other implementations, the command options that may be surfaced in association with each individual user can be tailored to that user's collaboration state. Commands may be surfaced in association with active users that provide for phone calls, instant messaging (chat), or other real-time features that won't be surfaced for offline users. An offline user, in contrast, may be associated with a command to re-invite the user to the group, or some other command to nudge the user to engage with the document. Some example user states include, but are not limited to: 1) being in a document and actively editing it; 2) being in the document but idle; 3) not being in the document, but having edited it in the past; and 4) not being in the document and having never edited it at all. Other states are possible in addition to or in place of those disclosed herein. In simplified terms, users may be in an active state, an idle state, or an offline state.

A technical effect that may result in such implementations includes an enhanced tool set for a user to collaborate with others on a document. Whereas past user interfaces included a simple list of users associated with a shared document, the lists contemplated herein are ordered in accordance with user collaboration states. This improves the user experience by giving a user an immediate and up-to-date view of who is presently working on a document and what their active level of involvement is.

Such enhancements to the user experience may have a further technical effect by allowing the view size of a list to be reduced, thereby taking up less visual real-estate on the screen of a small form-factor device (phones, tablets, wearables). For instance, by rendering active users at the top of a list and idle users at the bottom, the view size of a list can be reduced to where the idle users are not visible without extra navigation. But this is an acceptable constraint as at least some of the active users would remain visible.

Surfacing user-specific command sets also improves the user experience by giving a user a quick way to communicate and interact with others without attempting less relevant communication modes. This has the technical effect of reducing the quantity of communication actions (phone calls, video conferences) that would provide little benefit. Reducing the time to collaborate, and to complete a document, allows users in the aggregate to accomplish more in the aggregate.

FIG. 1 illustrates collaboration architecture 100 in an implementation of enhanced user interface technology for collaboration services. Collaboration architecture 100 includes service platform 101, which hosts collaboration service 105. Collaboration service 105 interfaces with various local applications to allow users to collaborate on content creation, represented by application 113 on application platform 111, as well as application 123 and application 133.

Figure 9:
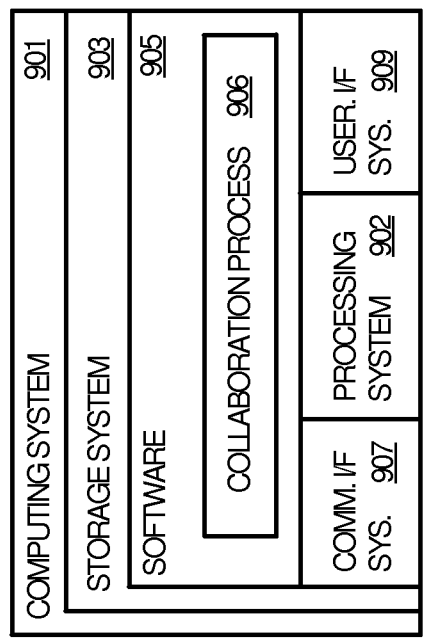
FIG. 9 illustrates a computing system suitable for implementing the enhanced collaboration service technology disclosed herein, including any of the architectures, elements, processes, and operational scenarios and sequences illustrated in the Figures and discussed below in the Technical Disclosure.

Service platform 101 is representative of any physical or virtual computing resource, or combination thereof, suitable for hosting an online service. Computing system 900, illustrated in FIG. 9, is representative of such computing resources, which include server computers, virtual machines, containers, and any variation, combination, or collection thereof. Collaboration service 105 is implemented in software and employs a collaboration process 200 when interacting with a local application.

Collaboration service 105 is implemented in program instructions that comprise various software modules, components, and other elements of the service. Collaboration process 200 (illustrated in FIG. 2) is representative of some of the functionality that may be provided by one or more of the software elements in collaboration service 105. Some commercial examples of collaboration service 105 include, but are not limited to, SharePoint® from Microsoft®, GoogleDocs®, and Quip®.

Application platform 111 is representative of any physical or virtual computing resource, or combination thereof, suitable for executing application 113, of which computing system 900 is representative. Examples of application platform 111 include, but are not limited to, desktop computers, laptop computers, tablet computers, mobile phones, phablet devices, wearable devices, virtual machines, and containers, as well as any variation, combination, or collection thereof.

Application 113 is implemented in software and, when executed by application platform 111, renders user interface 115 to collaboration service 105. Application 113 is implemented in program instructions that comprise various software modules, components, and other elements of the application. Collaboration process 300 (illustrated in FIG. 3) is representative of some of the functionality that may be provided by one or more of the software elements in application 113. Some commercial examples of application 113 include, but are not limited to, Microsoft® Word, Excel®, and PowerPoint®, as well as Google Docs® and Quip®. Application 113 may be a locally installed and executed application, a desktop application, a mobile application, a streamed (or streaming) application, a web-based application that is executed in the context of a web-browser, or any other type of application capable of employing collaboration process 300.

Application 123 and application 133 may also run on an application platform similar to application platform 111 (not shown for purposes of clarity). Each of application 123 and application 133 may also be a locally installed and executed application, a desktop application, a mobile application, a streamed (or streaming) application, a web-based application that is executed in the context of a web-browser, or any other type of application capable of employing collaboration process 300.

In operation, users engaged with applications 113, 123, and 133 to collaborate on content. The users associated with applications 113, 123, and 133 are represented by user 114, user 124, and user 134 respectively. As the users interact (or refrain from interacting) with content, their status is reported by their respective local application to collaboration service 105. Collaboration service 105 analyzes the activity and provides updates to the applications with which to update their user interfaces.

The users collaborate on content through the user interfaces rendered by their respective applications. For instance, application 113 renders user interface 115. It is assumed for exemplary purposes that the content the users are collaborating on is a document. Accordingly, document 117 is rendered in user interface 115. The document 117 includes text 118 and a graphical element 119. Other elements may be presented in user interface 115 in addition to or in place of those disclosed herein.

Collaboration service 105, via the updates it communicates to the applications, influences the display of content in user interface 115. In this example, it is the appearance of graphical element 119 that is affected by the updates. Graphical element 119 has a first appearance which is changed as updates are received by application 113. The changing appearance is related to the change in the collaborative state of each of the users that share document 117. As their collaboration states change, the appearance of graphical element 119 changes. This is represented in FIG. 1 by way of a changing fill pattern. Graphical element 119 initially has no fill pattern, followed by a diagonal fill pattern, and then a vertical pattern.

Figure 2:
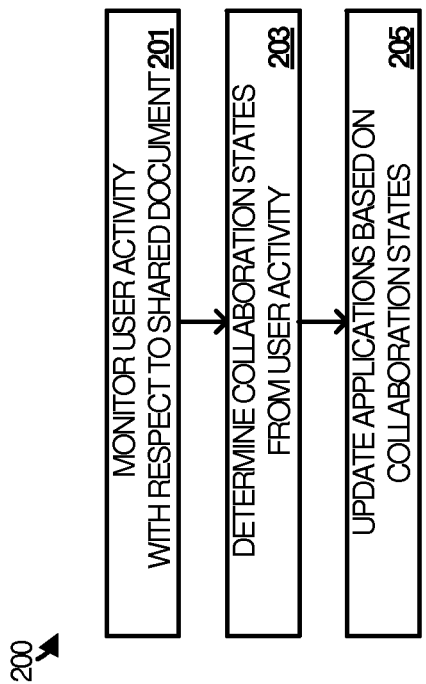
FIG. 2 illustrates a collaboration process in an implementation.

As mentioned collaboration service 105 employs collaboration process 200, illustrated in FIG. 2. Referring parenthetically to the steps in FIG. 2, collaboration service 105 monitors user activity that is ongoing with respect to a shared document, shared data bases, shared images, or any other type of content that can be shared in the context of a collaboration service (step 201).

As users engaged in collaborative activity (or refrain from it), collaboration service determines a collaboration state for each specific user based on their specific levels of collaboration (step 203). Collaboration service 105 then updates one or more of the local applications with information indicative of the individual collaboration states for each of the users (step 205). The local applications may use this information to change the visual state of an aspect of the user interface to the service.

Figure 3:
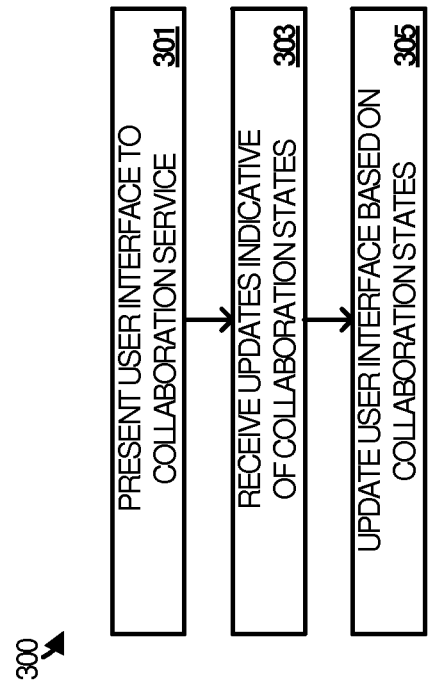
FIG. 3 illustrates a collaboration process in an implementation.

In particular, the local applications employ collaboration process 300, illustrated in FIG. 3. A given application initially presents a user interface to a collaboration service (step 301). The user interface may include, for example, a view to a document that is shared by a group of users.

The application continuously, periodically, or at some other interval receives updates from the collaboration service that indicate the collaboration state of each of the users in the group (step 303). The updates drive the application to update the user interface to reflect in a visual manner the new (updated) state of each user with respect to their collaboration on the shared document (step 305).

In a brief example, user 114 and user 124 may initially be editing a shared document, while user 134 is idle with respect to the document. This results in the initial appearance of graphical element 119. However, as the users become more collaboratively engaged with the document or less, the appearance of graphical element 119 changes. For instance, user 114 may cease to edit the document and may be passively reviewing it instead, while user 124 may transition to idle and user 134 may transition to an active editor. The appearance may change again as all three end-users transition to an idle state (or recently edited state).

Figure 4:
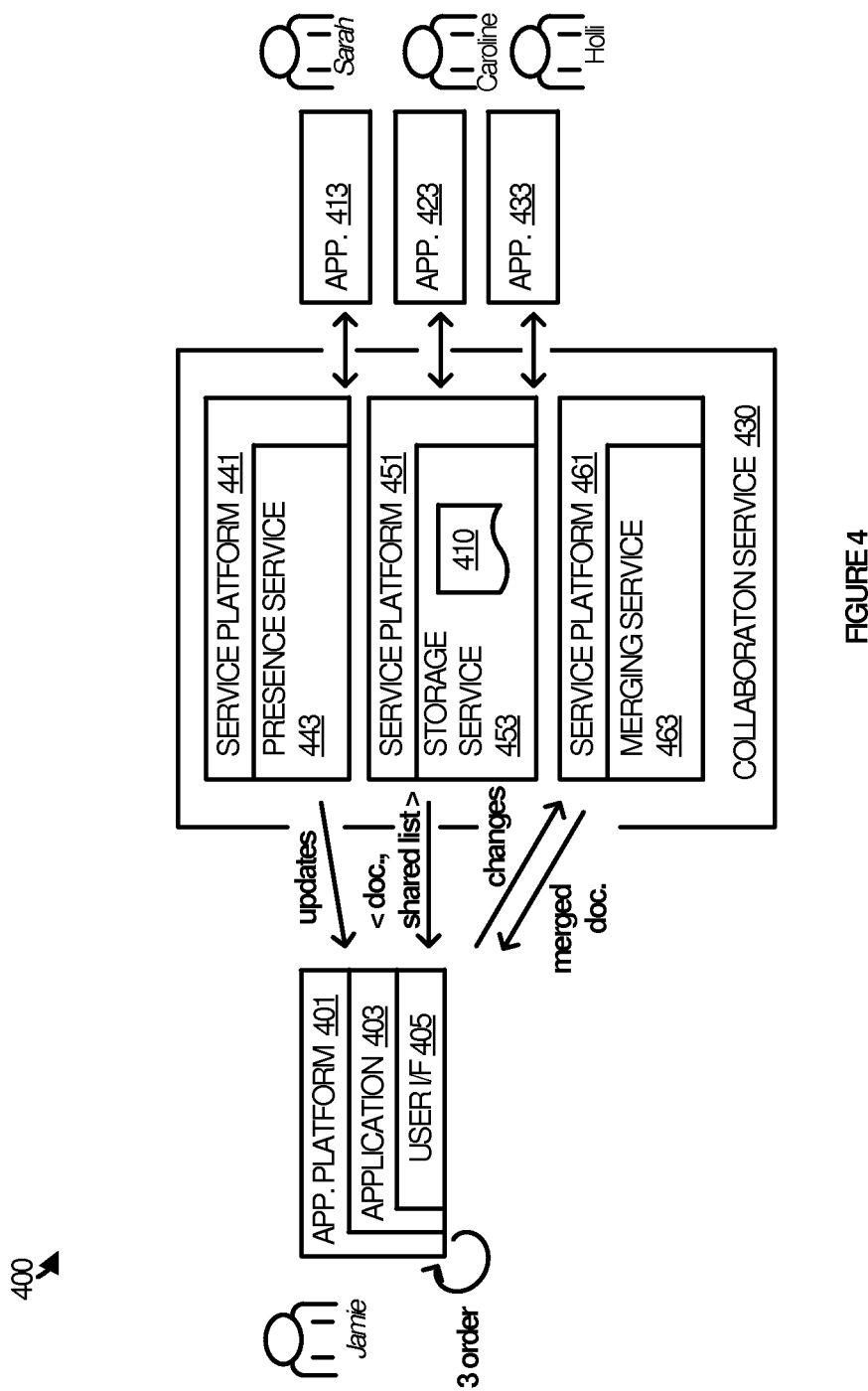
FIG. 4 illustrates a collaboration architecture in an implementation.

FIG. 4 illustrates another collaboration architecture, collaboration architecture 400, in an implementation. Collaboration architecture 400 includes an application platform 401 that runs an application 403 for interfacing with a collaboration service 430. Collaboration service 430 includes various service platforms (441, 451, and 461) that host various aspects of the collaboration service. Service platform 441 hosts presence service 443; service platform 451 hosts storage service 453; and service platform 461 hosts merging service 463.

Users engage with collaboration service 430 via their applications, of which application 403, application 413, application 423, and application 433 are representative. Application platform 401 is representative of any physical or virtual computing system(s) capable of hosting an application, such as computing system 901 in FIG. 9, and implementing collaboration process 300 or variations thereof. Examples of application platform 401 include, but are not limited to, desktop computers, laptop computers, tablet computers, mobile phones, phablet devices, wearable devices, virtual machines, and containers, as well as any variation, combination, or collection thereof.

Applications 413, 423, and 433 may also run on an application platform similar to application platform 401 (not shown for purposes of clarity). Applications 403, 413, 423, and 433 may be locally installed and executed applications, desktop applications, mobile applications, streamed (or streaming) applications, web-based applications that executed in the context of a web-browser, or any other type of application.

The various components of collaboration service 430 each provide a specific function. Presence service 443, storage service 453, and merging service 463 may run on separate computing systems (as shown) or may be integrated on an integrated platform.

Presence service 443 monitors and analyzes user activity to determine a level of collaboration by a given user with respect to a shared document. Storage service 453 provides a document storage function such that documents may be stored and retrieved by a group of users associated with a document. Merging service 463 tracks what changes are being made to a document by which users and ultimately merges the changes into an updated document. Merging service 463 may also resolve conflicts between edits and perform other roles associated with document collaboration. Other services, roles, or other functionality that may be associated with a collaboration service (web servers, application servers) may be included in collaboration service 430, in addition to or in place of those disclosed herein.

Service platforms 441, 451, and 461 are each representative of any physical or virtual computing resource, or combination thereof, suitable for hosting all or part of an online service. Computing system 900, illustrated in FIG. 9, is representative of such computing resources, which include server computers, virtual machines, containers, and any variation, combination, or collection thereof. Taken together, the elements of collaboration service 430 are capable if implementing a collaboration process, such as collaboration process 200 or variations thereof.

Figure 5:
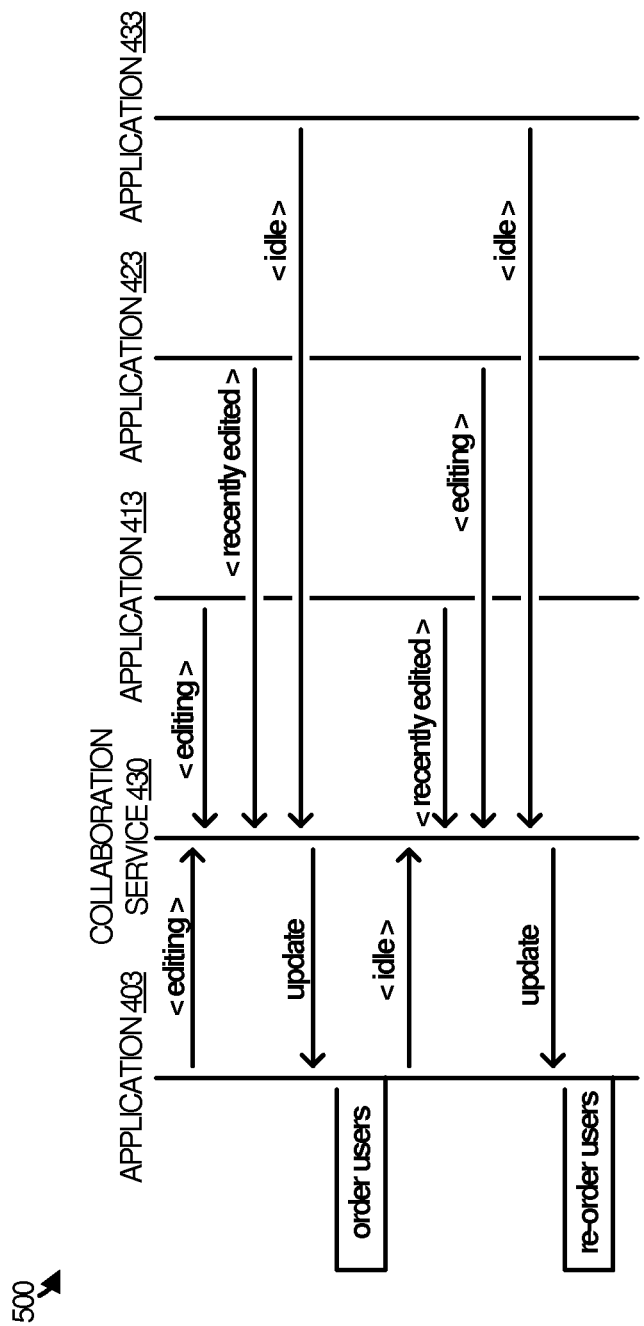
FIG. 5 illustrates an operational sequence in an implementation.

FIG. 5 illustrates operational sequence 500 to demonstrate an implementation of enhanced collaboration technology. In operation, a user (Jamie) engaged with application 403 edits a document that is shared with Sarah, Caroline, and Holli. Application 403 reports the user activity to collaboration service 430.

Internal to collaboration service 430, storage service 453 provides the document to application 403 to render in user interface 405 to the user. Storage service 453 also provides the document to applications 413, 423, and 433 for rendering in their user interfaces respectively. The other applications also report user activity to collaboration service indicative of the actions taken by their associated users (or lack thereof).

Presence service 443 receives the reported user activity and determines where in a range of collaboration states a given user falls. The collaboration state ascertained for a given user helps to determine how to visualize the group of users in a user interface. Continuing with this example scenario, application 413 also reports that its associated user is editing document 410, while application 423 reports that its user recently edited the document. Application 433 reports that its user, Holli, has been idle.

From these activity reports, presence service 443 determines a specific collaboration state for each user from a range of possible collaboration states. Presence service 443 updates each application with information indicative of the collaboration states for the users. The applications order a list of the users in their respective user interfaces in an order related to their collaboration states in the range. In some cases, the order of users in the list may correspond directly to their relative states. In other cases, other factors may be considered, in addition to collaboration state. For example, the likelihood that a given user will communicate with another user may influence the other user's position in the list. The more likely one is to communicate with another user, the higher in the list the user will be displayed relative to other users. The less likely one is to communicate with another user, the lower in the list the user will be displayed relative to the other users. These other factors could be considered in addition to collaboration state.

As an example the range of possible collaboration states may include a presently editing state associated with any of the users presently editing the shared document, a recently edited state associated with others of the users having recently edited the shared document, and an idle state associated with ones of the users neither presently editing the shared document nor having recently edited the shared document. Other states in addition to, or in place of, those disclosed herein may be considered within the scope of this disclosure. In some scenarios, it may be possible to track where a user is editing in a document, in which case the update information may also indicate a user's editing location. The update information may even provide a sample or summary of a user's recent edits to accompany the state information for the user.

The users may continue to collaborate on the shared documents. Accordingly, their applications will report their new user activity to presence service 443, which analyzes the activity and returns updates accordingly. As the users' collaboration states change, so too may they listed order in the user interfaces. For example, application 403 receives an update from collaboration service 430 and re-orders the list of users in its user interface 405.

For example, as a user transitions to idle from editing, her position in a list of users may be reduced. Likewise, as a user transitions to editing from idle, she may move up in positions in the list. The users' relative positions in the list give a user viewing the list a quick and easy way to ascertain the collaborative state of her fellow group members. In addition to their order in the list, a user's state may be provided in additional ways to further enhance the ability of a user to ascertain the collaboration state of others. For instance, a given user's state may be represented displaying text indicative of their state, displaying the user's name in a particular format that indicates state, or providing the user's name in association with a particular symbol that indicates their editing state. Thus, a user who is actively editing a document may be represented at the top of a list of shared users and in a manner visually representative of her actively editing state. A different user who has the document open, but who is idle in the document, could be represented in a manner that differs visually with respect to the first user, and lower in the list. Yet another user who is offline entirely could be represented in another, visually distinct manner relative to the first two users and further down in the list due to his offline state.

In some implementations, presence service 443 is capable of merging lists of users to provide a unified list of users in application user interfaces. The lists may include, for example, a list of all users that share a document and a separate list of users actively collaborating (editing, reviewing, etc.) a document. Rather than providing two lists to end-user applications, presence service 443 can merge the list and provide a merged list to the end-user applications. In other implementations, both lists may be provided to the end-user applications for the end-user applications to merge into unified lists.

Figure 6:
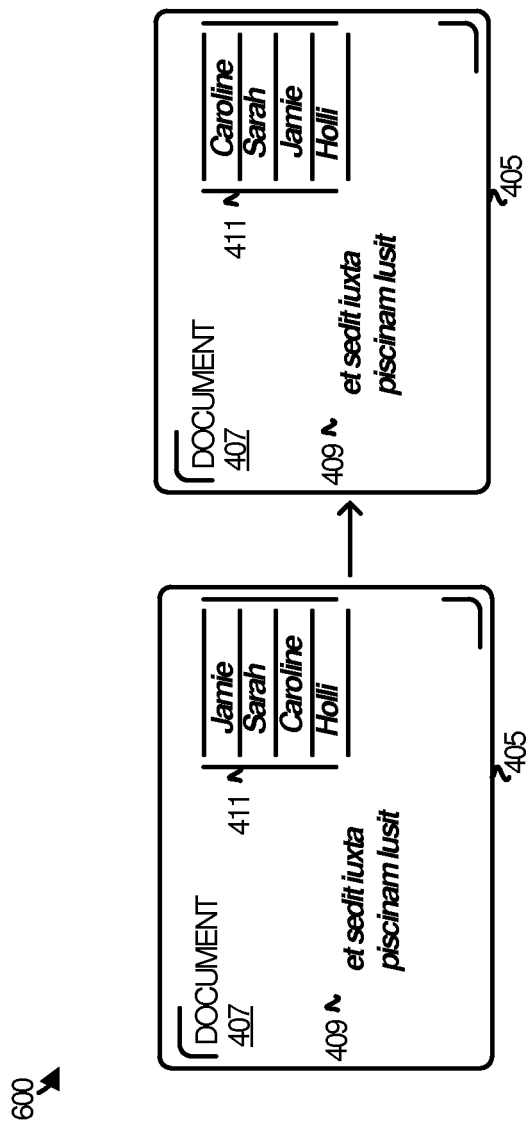
FIG. 6 illustrates an operational scenario in an implementation.

FIG. 6 illustrates a brief operational scenario 600 to further illustrate aspects of enhanced document collaboration. In operational scenario 600, user interface 405 (from FIG. 4) includes a document 407, text 409 in the document, and a view 411 of a list of users that share document 407.

The list includes the names of the users associated with document 407 and in an order driven by their respective collaboration states. Jamie is listed first, as she was editing the document, followed by Sarah and Caroline for having recently edited the document, and lastly by Hollie for being idle.

However, application 403 may re-order the list upon receiving an update or updates from collaboration service 430. Per the sequence illustrated in FIG. 5, the list is re-ordered to begin with Caroline (editing), followed by Sarah (recently edited) and Jamie (idle), and then Hollie (still idle).

While in the foregoing examples the name of the user associated with user interface 405 is included in the list (Jamie), in some implementations, that user's name may be omitted. In addition, while all of the users' names are visible in the foregoing examples, in some implementations some of the names may be hidden for view or not included in a list. This may be the case when, for example, there are a large number of users with whom a document is shared and/or a large number of users share the same state (i.e. idle).

Figure 7:
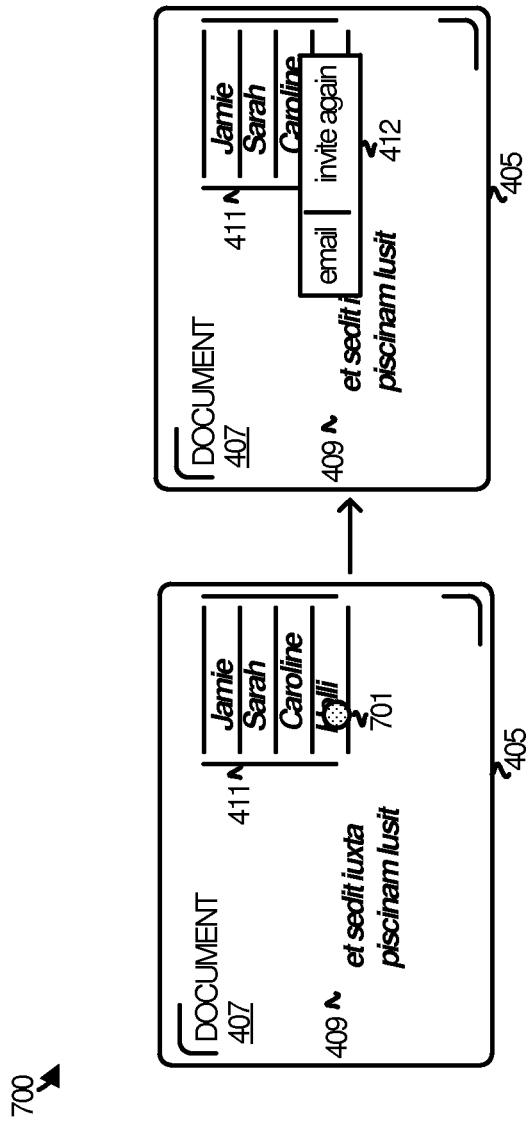
FIG. 7 illustrates an operational scenario in an implementation.

FIG. 7 illustrates another operational scenario 700 to further illustrate aspects of enhanced document collaboration. In operational scenario 700, user interface 405 again includes document 407, text 409, and view 411 of the list of shared users.

In operation, the user engaged with user interface 405 makes a selection 701 of a user, Hollie in this example. Application 403 surfaces a command menu 412 in user interface 405. Command menu 412 includes various command options that are selected based on the collaboration state of Hollie. The options are to email the user and to invite her (again) to collaborate on document. Other command options in addition to or in place of those disclosed herein are possible.

Figure 8:
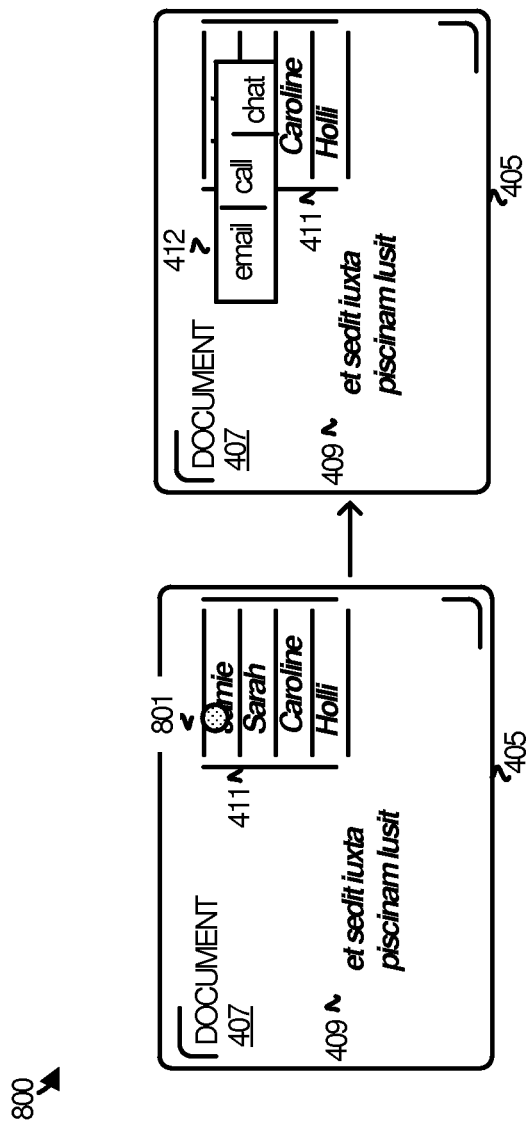
FIG. 8 illustrates an operational scenario in an implementation.

In operational scenario 800, in FIG. 8, a different series of events occurs. In operational scenario 800, user interface 405 includes document 407, text 409, and the view 411 of the users. Rather than selecting Hollie, selection 801 is made of Jamie. Due to Jamie's collaborations state (editing), a different set of command options are selected and surfaced in command menu 412. The selected command options are to email the user, chat with the user, or to call the user. Other command options in addition to or in place of those disclosed herein are possible and may be considered within the scope of the disclosure.

FIG. 9 illustrates computing system 901 that is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes collaboration process 906, which is representative of the collaboration processes (both client-side and server-side) discussed with respect to the preceding FIGS. 1-8. When executed by processing system 902 to enhance document collaboration, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced document collaboration.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include collaboration process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced document collaboration. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1. An apparatus comprising: one or more computer readable storage media; and program instructions stored on the one or more computer readable storage media for presenting a user interface to a collaboration service that, when executed by a processing system, direct the processing system to at least: receive information from the collaboration service indicative of a collaboration state of each user of a plurality of users with respect to a shared document; for each of the plurality of users, identify which collaboration commands to associate specifically with the user based on the collaboration state of the user; and responsive to a selection of a representation of a given one of the plurality of users, render the collaboration commands specifically associated with the user in the user interface.

Example 2. The apparatus of Example 1 wherein the program instructions further direct the processing system to render the shared document in the user interface in association with the collaboration commands.

Example 3. The apparatus of Examples 1-2 wherein the program instructions further direct the processing system to render a list of the plurality of users in the user interface from which to select the representation of the given one of the plurality of users.

Example 4. The apparatus of Examples 1-3 wherein the collaboration state comprises one in a range of possible collaboration states.

Example 5. The apparatus of Examples 1-4 wherein collaboration commands differ by at least one for each of the possible collaboration states.

Example 6. The apparatus of Examples 1-5 wherein the range of possible collaboration states includes a presently editing state, a recently edited state, and an idle state.

Example 7. The apparatus of Examples 1-6 wherein the collaboration commands comprise an instant message command, an email command, a call command, a follow command, a nudge command, and an invite command.

Example 8. The apparatus of Examples 1-7 wherein the collaboration commands in the presently editing state comprise the instant message command and the call command, wherein the collaboration commands in the idle state do not include the instant message command and the call command.

Example 9. The apparatus of Examples 1-9 further comprising the processing system operatively coupled to the one or more computer readable storage media, wherein the processing system reads and executes the program instructions.

Example 10. The apparatus of Examples 1-10 wherein the shared document comprises one of a word processing document, a spreadsheet workbook, and a presentation document.

Example 11. A method of operating a collaboration service comprising: monitoring a collaboration state for each of a plurality of users associated with a shared document; identifying which collaboration commands to surface in association with each user of the plurality of users based at least in part on the collaboration state for the user; and updating a plurality of applications associated with the plurality of users with the collaboration state and the collaboration commands for each of the plurality of users for surfacing in a user interface to an application.

Example 12. The method of Example 11 wherein the collaboration state comprises one in a range of possible collaboration states.

Example 13. The method of Examples 11-12 wherein collaboration commands differ by at least one for each of the possible collaboration states.

Example 14. The method of Examples 11-13 wherein the range of possible collaboration states includes a presently editing state, a recently edited state, and an idle state.

Example 15. A method of presenting a user interface to a collaboration service, the method comprising: receiving information from the collaboration service indicative of a collaboration state of each user of a plurality of users with respect to a shared document; for each of the plurality of users, identifying which collaboration commands to associate specifically with the user based on the collaboration state of the user; and responsive to a selection of a representation of a given one of the plurality of users, rendering the collaboration commands specifically associated with the user in the user interface.

Example 16. The method of Example 15 further comprising rendering the shared document in the user interface in association with the collaboration commands.

Example 17. The method of Examples 15-16 further comprising rendering a list of the plurality of users in the user interface from which to select the representation of the given one of the plurality of users.

Example 18. The method of Examples 15-17 wherein the collaboration state comprises one in a range of possible collaboration states.

Example 19. The method of Examples 15-18 wherein collaboration commands differ by at least one for each of the possible collaboration states.

Example 20. The method Examples 15-19 wherein the range of possible collaboration states includes a presently editing state, a recently edited state, and an idle state and wherein the collaboration commands comprise an instant message command, an email command, a call command, a follow command, a nudge command, and an invite command.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
   one or more computer readable storage devices; and
   program instructions stored on the one or more computer readable storage devices for presenting a user interface to a collaboration service that, when executed by a processing system, direct the processing system to at least:
   in the user interface, render a shared document and a list of users;
   receive information from the collaboration service indicative of a collaboration state of a user in the list of users, wherein the collaboration state of the user comprises one in a set of possible collaboration states, and wherein the set of possible collaboration states comprises a presently editing state and an idle state;
   identify, based at least in part on the collaboration state of the user, which combination of collaboration commands of multiple combinations of the collaboration commands to associate specifically with the user, wherein each of the multiple combinations of the collaboration commands corresponds to a different one of the set of possible collaboration states; and
   responsive to a selection of the user, render, in the user interface, the combination of the collaboration commands specifically associated with the user;
   wherein when the collaboration state of the user comprises the presently editing state, the combination of the collaboration commands includes an instant message command and a call command and excludes an invite again command; and
   wherein when the collaboration state of the user comprises the idle state, the combination of the collaboration commands includes the invite again command and excludes the instant message command and the call command.

2. The apparatus of claim 1 wherein the program instructions further direct the processing system to merge a base list of users associated with the shared document with an other list consisting of users presently editing the shared document, wherein merging the base list and the other list produces the list of users.

3. The apparatus of claim 1 wherein the program instructions further direct the processing system to render the list of users in an order based at least in part on a collaboration state of each user of the list of users.

4. The apparatus of claim 3 wherein the program instructions further direct the processing system to:
   receive updates, from the collaboration service, indicative of updated collaboration states associated with the list of users; and
   responsive to the updates, re-order the list of users based at least in part on the updated collaboration states.

5. The apparatus of claim 3 wherein the program instructions further direct the processing system to render, at a top position in the list of users, users that have the presently editing state.

6. The apparatus of claim 1 wherein the collaboration commands are selectable to initiate communication actions with the user.

7. The apparatus of claim 1 wherein the collaboration commands comprise an instant message command, an email command, a call command, a follow command, a nudge command, and an invite again command.

8. The apparatus of claim 1 wherein the shared document comprises one of a word processing document, a spreadsheet workbook, and a presentation document.

9. A computer-implemented method of operating a collaboration service comprising:
   monitoring a collaboration state of a user of a plurality of users associated with a shared document, wherein the collaboration state of the user comprises one in a set of possible collaboration states, and wherein the set of possible collaboration states comprises a presently editing state and an idle state;
   identifying, based at least in part on the collaboration state of the user, which combination of collaboration commands of multiple combinations of the collaboration commands to surface in association with the user, wherein each of the multiple combinations of the collaboration commands corresponds to a different one of the set of possible collaboration states; and
   updating, with the collaboration state of the user and the combination of the collaboration commands, a plurality of applications associated with the user;
   wherein when the collaboration state of the user comprises the presently editing state, the combination of the collaboration commands includes an instant message command and a call command and excludes an invite again command; and
   wherein when the collaboration state of the user comprises the idle state, the combination of the collaboration commands includes the invite again command and excludes the instant message command and the call command.

10. The computer-implemented method of claim 9 wherein the collaboration commands are selectable to initiate communication actions with a given one of the plurality of users.

11. The computer-implemented method of claim 9 further comprising organizing the plurality of users in an order based at least in part on a collaboration state of each user of the plurality of users.

12. The computer-implemented method of claim 11 further comprising:
   receiving updates, from the collaboration service, indicative of updated collaboration states associated with the plurality of users; and
   responsive to the updates, re-ordering the plurality of users based at least in part on the updated collaboration states.

13. The computer-implemented method of claim 11 further comprising rendering, at a top position of the order, users that have the presently editing state.

14. The computer-implemented method of claim 9 further comprising merging a base list of users associated with the shared document with an other list consisting of users presently editing the shared document, wherein merging the base list and the other list produces the list of users.

15. A method of presenting a user interface to a collaboration service, the method comprising:
   in the user interface, rendering a shared document and a list of users;
   receiving information from the collaboration service indicative of a collaboration state of a user in the list of users, wherein the collaboration state of the user comprises one in a set of possible collaboration states, and wherein the set of possible collaboration states comprises a presently editing state and an idle state;
   identifying, based at least in part on the collaboration state of the user, which combination of collaboration commands of multiple combinations of the collaboration commands to associate specifically with the user, wherein each of the multiple combinations of the collaboration commands corresponds to a different one of the set of possible collaboration states; and responsive to a selection of the user, rendering, in the user interface, the combination of the collaboration commands specifically associated with the user;

wherein when the collaboration state of the user comprises the presently editing state, the combination of the collaboration commands includes an instant message command and a call command and excludes an invite again command; and wherein when the collaboration state of the user comprises the idle state, the combination of the collaboration commands includes the invite again command and excludes the instant message command and the call command.

16. The method of claim 15 further comprising, responsive to a selection of a collaboration command, launching a communication service through which a communication action is performed.

17. The method of claim 15 further comprising rendering the list of users in an order based at least in part on a collaboration state of each user in the list of users.

18. The method of claim 17 further comprising:

receiving updates, from the collaboration service, indicative of updated collaboration states associated with the list of users; and responsive to the updates, re-order the list of users based at least in part on the updated collaboration states.

19. The method of claim 15 wherein the collaboration commands are selectable to initiate communication actions with a given user in the list of users.

20. The method claim 15 wherein the collaboration commands comprise an instant message command, an email command, a call command, a follow command, a nudge command, and an invite again command.

* * * * *